United States Patent
Tvetene

(10) Patent No.: US 7,740,083 B2
(45) Date of Patent: Jun. 22, 2010

(54) SOD HARVESTING APPARATUS

(75) Inventor: Gregg Tvetene, Billings, MT (US)

(73) Assignee: Trebro Holding Co., Inc., Billings, MT (US)

( * ) Notice: Subject to any disclaimer, the term of this patent is extended or adjusted under 35 U.S.C. 154(b) by 0 days.

(21) Appl. No.: 12/220,112

(22) Filed: Jul. 22, 2008

(65) Prior Publication Data

US 2009/0025945 A1    Jan. 29, 2009

Related U.S. Application Data

(60) Provisional application No. 60/961,604, filed on Jul. 23, 2007.

(51) Int. Cl.
*A01B 45/04* (2006.01)
(52) U.S. Cl. .................................................. 172/20
(58) Field of Classification Search ............ 172/2, 172/19, 20; 180/252, 253, 403, 408, 414; 280/93.504, 124.146, 124.147; 414/501, 414/502, 111, 791.5, 791.6, 791.7, 792, 789.7
See application file for complete search history.

(56) References Cited

U.S. PATENT DOCUMENTS

| | | | |
|---|---|---|---|
| 1,349,926 A | 8/1920 | Thompson | |
| 2,682,824 A | 7/1954 | Bowser et al. | |
| 3,519,082 A | 7/1970 | Miner | |
| 3,580,375 A | 5/1971 | Nunes, Jr. | |
| 3,653,448 A * | 4/1972 | Morrill | 172/19 |
| 3,672,452 A | 6/1972 | Miner | |
| 4,345,659 A | 8/1982 | Arnold | |
| 4,354,556 A | 10/1982 | Evans | |
| 4,507,910 A | 4/1985 | Thornley et al. | |
| 4,566,553 A * | 1/1986 | McCutcheon | 180/237 |
| 4,573,124 A | 2/1986 | Seiferling | |
| 4,616,713 A | 10/1986 | Shattuck | |
| 4,733,355 A | 3/1988 | Davidson et al. | |
| 4,754,815 A | 7/1988 | Brouwer et al. | |
| 4,777,890 A | 10/1988 | Raymond | |
| 4,832,130 A | 5/1989 | Brouwer et al. | |
| 4,883,965 A | 11/1989 | Bohman | |
| 4,918,441 A | 4/1990 | Bohman | |
| 4,944,352 A | 7/1990 | Brouwer et al. | |
| 5,031,705 A | 7/1991 | Clemens | |
| 5,039,129 A * | 8/1991 | Balmer | 180/308 |
| 5,170,848 A | 12/1992 | Walton | |
| 5,269,379 A | 12/1993 | Millar et al. | |
| 5,911,669 A | 6/1999 | Stentz et al. | |
| 6,244,354 B1 | 6/2001 | Van Vuuren | |
| 6,296,063 B1 | 10/2001 | Tvetene et al. | |
| 6,364,027 B1 | 4/2002 | Tvetene et al. | |
| 6,371,237 B1 * | 4/2002 | Schaffer | 180/253 |
| 6,659,189 B2 | 12/2003 | Woerner et al. | |
| 6,681,864 B2 | 1/2004 | Tvetene et al. | |
| 6,769,495 B1 | 8/2004 | Van Leon | |
| 6,779,610 B2 | 8/2004 | Brouwer et al. | |
| 6,783,318 B2 | 8/2004 | Tvetene et al. | |
| 7,021,584 B2 | 4/2006 | Hendriks et al. | |

(Continued)

*Primary Examiner*—Robert E Pezzuto
(74) *Attorney, Agent, or Firm*—Holland & Hart, LLP

(57) ABSTRACT

A sod harvesting apparatus comprises at least two different configurations. In at least one configuration, the sod harvesting apparatus is set up to harvest sod from a field. In at least one configuration, the sod harvesting apparatus is set up for transportation, storage, or the like, by reducing the overall size of the sod harvesting apparatus.

17 Claims, 15 Drawing Sheets

U.S. PATENT DOCUMENTS

| | | |
|---|---|---|
| 7,066,277 B2 | 6/2006 | Hendriks et al. |
| 7,070,004 B2 | 7/2006 | Hendriks et al. |
| 7,096,967 B2 | 8/2006 | Pohlman, Jr. et al. |
| 7,195,077 B2 | 3/2007 | Devries |
| 7,246,669 B2 | 7/2007 | Cammack |
| 7,264,063 B1 * | 9/2007 | Dover .......................... 172/2 |

* cited by examiner

SOD HARVESTING APPARATUS

This application claims the benefit of priority to U.S. Provisional Application No. 60/961,604, filed Jul. 23, 2007, the entirety of which is hereby incorporated by reference.

BACKGROUND

The concept of sod harvesting is old in the art. Typically, a sod slab is cut free from a sod field and then rolled up into a cylindrical sod roll. Sod rolls are then transferred to a pallet by a sod roll pickup mechanism. Once a group of sod rolls are transferred to a pallet, the pallet is then transported to a delivery truck or the like to ship the sod rolls to a desired destination.

Numerous devices for mechanizing the sod harvesting and delivery process are also known in the art. Such devices typically comprise a tractor-like vehicle modified with apparatus for cutting free slabs of sod from a sod field as the tractor is driven through a sod field, rolling the sod slabs into cylindrical sod rolls, accumulating a plurality of sod rolls in a queue, and transferring the queue of sod rolls to a sod carrier. For example, U.S. Pat. No. 6,296,063 to Tvetene et al., hereby incorporated by reference in its entirety, discloses an automatic sod harvester. As shown in FIG. 1, the sod harvester of the '063 patent includes a cutting mechanism 11 for freeing a section of sod from a sod field, a sod roller 12 for rolling the section of sod into a sod roll, a sod roll accumulator 13 having sod troughs therein for receiving and holding sod rolls therein, a sod roll pickup mechanism 14 for lifting the sod roll onto the sod roll accumulator 13 and transferring the sod roll to a sod roll carrier 15a for delivery of the sod roll.

As can be seen from the sod harvester disclosed in the '063 patent and illustrated in FIG. 1, devices for mechanizing sod harvesting are typically very large. The large sod harvesters are therefore difficult to transport, such as when shipping a sod harvester to a customer. Normally the sod harvesters are loaded in larger containers to protect the sod harvester from damage during shipping, and consequently the containers must be as large as the sod harvester. The larger the container, the fewer containers can be shipped on a single flat bed truck, freighter or the like, thereby increasing shipping costs. Alternatively, the containers are a pre-set size, and if the sod harvester is larger than the container, the sod harvester cannot be shipped in the container, which leads to further increases in shipping costs.

Accordingly, a need exists for a sod harvester that is compact or may be made compact for ease of transportation without sacrificing any of the functionality of the sod harvester.

SUMMARY

The instant disclosure relates generally to sod harvesting apparatus. In one embodiment, the sod harvesting apparatus has multiple configurations, wherein at least one of the configurations reduces the overall size of the sod harvesting apparatus and thereby facilitates transportation of the sod harvester.

One aspect of the instant disclosure relates to a sod harvesting apparatus. Particularly, the sod harvesting apparatus may have a first configuration and a second configuration. The sod harvesting apparatus may comprises a frame, a first rear wheel and a second rear wheel coupled to the frame and a transport frame. The frame may define an inner sod harvesting apparatus area. The first rear wheel may be located outside the inner sod harvesting apparatus area when the sod harvesting apparatus is in the first configuration and the first rear wheel may be located inside the inner sod harvesting apparatus area when the sod harvesting apparatus is in the second configuration. The first rear wheel may be operable when in either the inside or outside location. The sod harvesting apparatus may also comprise a transport frame. The transport frame may be oriented generally perpendicular to a longitudinal axis of the sod harvesting apparatus when the sod harvesting apparatus is in the first configuration and may be oriented generally parallel to the longitudinal axis of the sod harvesting apparatus when the sod harvesting apparatus is in the second configuration.

Features from any of the above mentioned embodiments may be used in combination with one another, without limitation. In addition, other features and advantages of the instant disclosure will become apparent to those of ordinary skill in the art through consideration of the ensuring description, the accompanying drawings, and the appended claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION

Figure 1:
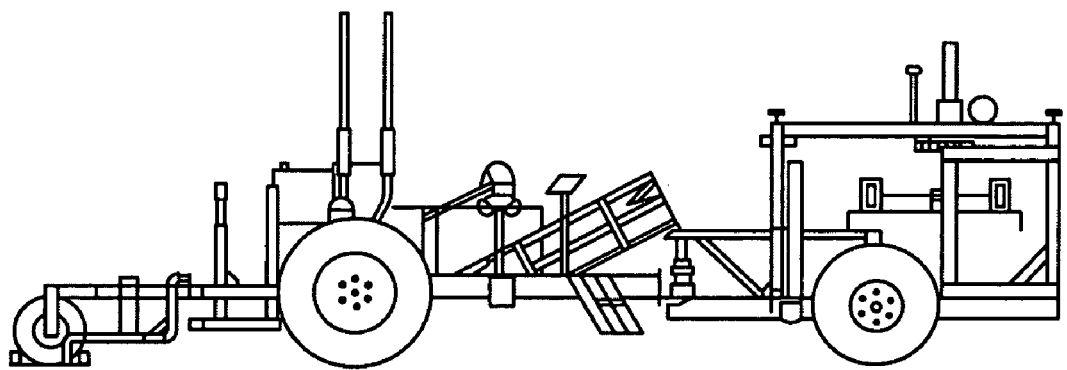
FIG. 1 shows a side view of a prior art sod harvesting apparatus.
Figure 2:
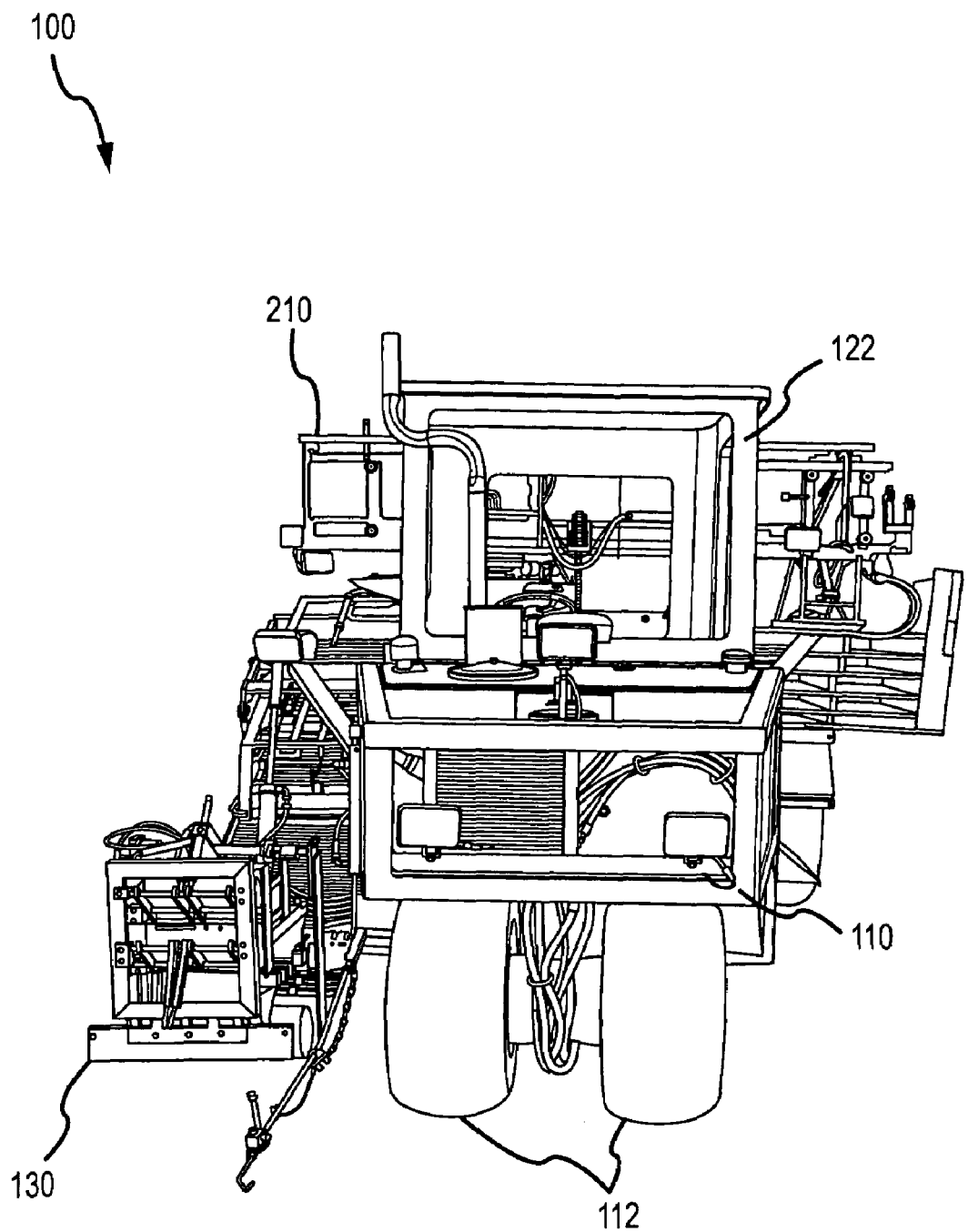
FIG. 2 shows a front perspective view of a sod harvesting apparatus.

The instant disclosure relates generally to a sod harvesting apparatus. In one embodiment that sod harvesting apparatus may include at least two configurations, wherein at least one configuration minimizes the overall size of sod harvesting apparatus. Particularly, a first rear wheel may be located in a first or second configuration and a transport frame may be located in a first or second configuration. The overall size of the sod harvesting apparatus may be smaller when the first rear wheel and transport frame assembly are located in the second configuration.

FIGS. 2-6 show a front perspective view, a rear perspective view, a left side perspective view, a right side perspective view and a top elevational view of a sod harvesting apparatus 100, respectively. Sod harvesting apparatus 100 may generally comprise a frame 110 and a cab 120, wherein front wheels 112, first rear wheel 114 and second rear wheel 116 may be coupled to frame 110 to thereby form the general tractor-like structure of sod harvesting apparatus 100. Cab 120 for housing controls and the operator of sod harvesting apparatus 100 may be located generally in the central region of frame 110. Front wheels 112 may be located generally at the center of the front end of sod harvesting apparatus 100, while first and second rear wheels 114, 116 may be located generally at opposing sides of the rear portion of frame 110. Sod harvesting apparatus 100 may include an engine, such that sod harvesting apparatus 100 is self-propelled.

Sod harvesting apparatus 100 may further comprise a cutter assembly 130. Cutter assembly 130 may be positioned to the side of sod harvesting apparatus 100 and generally at the middle of the length of sod harvesting apparatus 100. Cutter assembly 130 may use a blade to separate the sod from the ground in which it grows by cutting beneath the sod as sod harvesting apparatus 100 travels forward in a sod field. After a length of sod has been separated from the ground, a blade may be used to cut the sod into a sod slab. Both the thickness and the length of sod slabs may be varied by adjusting the blade of cutter assembly 130. Cutter assembly 130 may also include a guide to guide cutter assembly 130 along the edge of the sod and maintain a uniform width of the sod slab.

Sod harvesting apparatus 100 may also comprise a conveyor assembly 140. Like cutter assembly 130, conveyor assembly 140 may be positioned to the side of sod harvesting apparatus 100. In particular, conveyor assembly 140 may be located behind (i.e., towards the rear of sod apparatus assembly 100) cutter assembly 130 such that slabs of sod cut by cutter assembly 130 may be deposited on conveyor assembly 140. Conveyor assembly 140 may be configured to move sod slabs away from cutter assembly 130 and towards a sod roll queue 150. Conveyor assembly 140 may be inclined such that sod slabs cut from the field move upwardly as they are transported towards sod roll queue 150.

While passing along conveyor assembly 140, the sod slab may be formed into a cylindrical roll. Any method for rolling the sod slab into a roll may be used. Exemplary methods suitable for use in the instant disclosure are described in U.S. Pat. Nos. 6,681,864, 6,783,318, 6,364,027 and 6,296,063, hereby incorporated by reference in their entirety. At the top of conveyor assembly 140, sod rolls may be deposited in sod roll queue 150.

Sod roll queue 150 may provide an area for the sod rolls to be arranged in a row and to be temporarily stored. Like cutter assembly 130 and conveyor assembly 140, sod roll queue 150 may be positioned to the side of sod harvesting apparatus 100. Sod roll queue 150 may comprise one or more conveyor belts 152 having a first end and a second end. Sod rolls exiting conveyor assembly 140 may be deposited on the first end of conveyor belt 152, whereupon conveyor belt 152 may transport the sod roll towards the second end of conveyor belt 152. The second end of conveyor belt 152 may be located at the rear of sod harvesting apparatus 100. Additional sod rolls deposited on the first end of conveyor belt 152 may likewise be transported towards the second end of conveyor belt 152 until the length of conveyor belt 152 is occupied with sod rolls. At that point, a queue of sod rolls has been prepared on sod roll queue 150 and may be ready for transport to a sod carrier 170.

Figure 3:
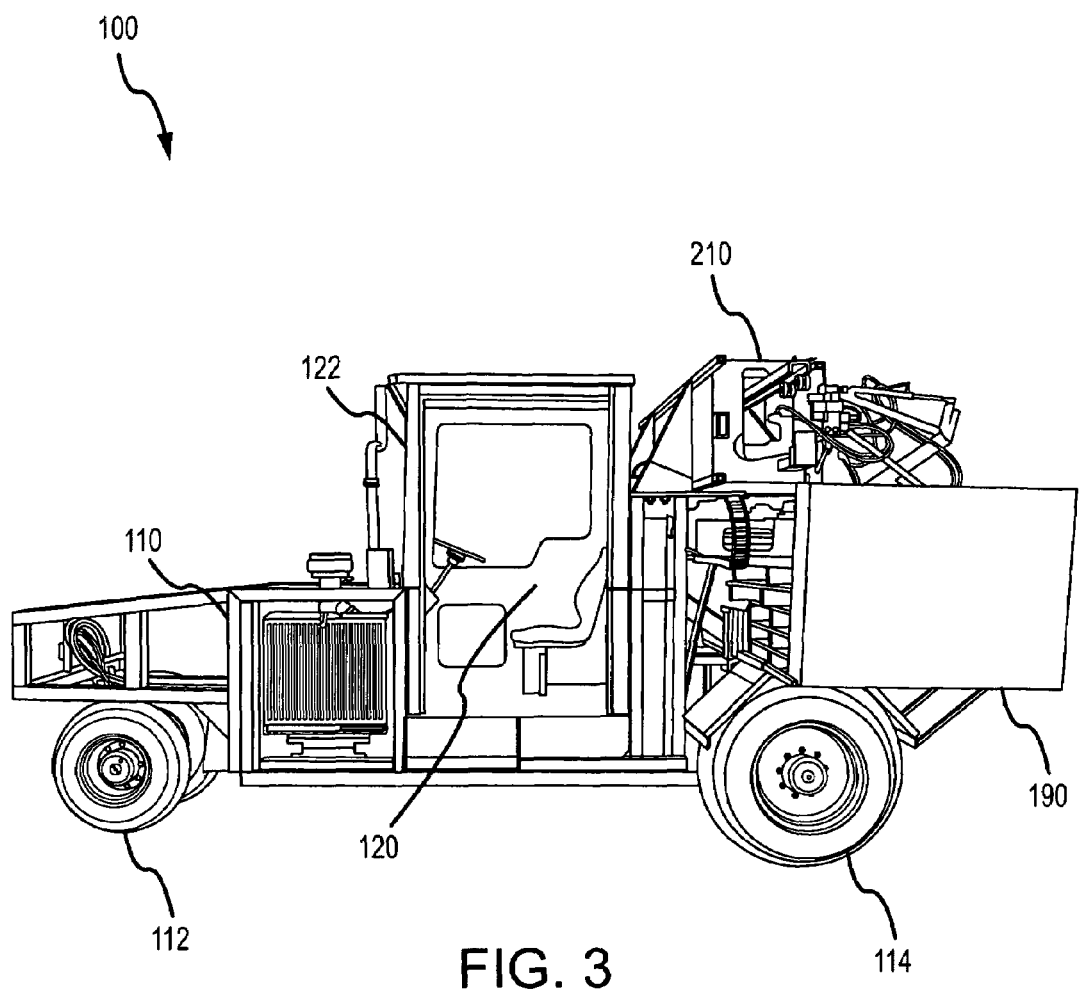
FIG. 3 shows a left side perspective view of a sod harvesting apparatus.
Figure 4:
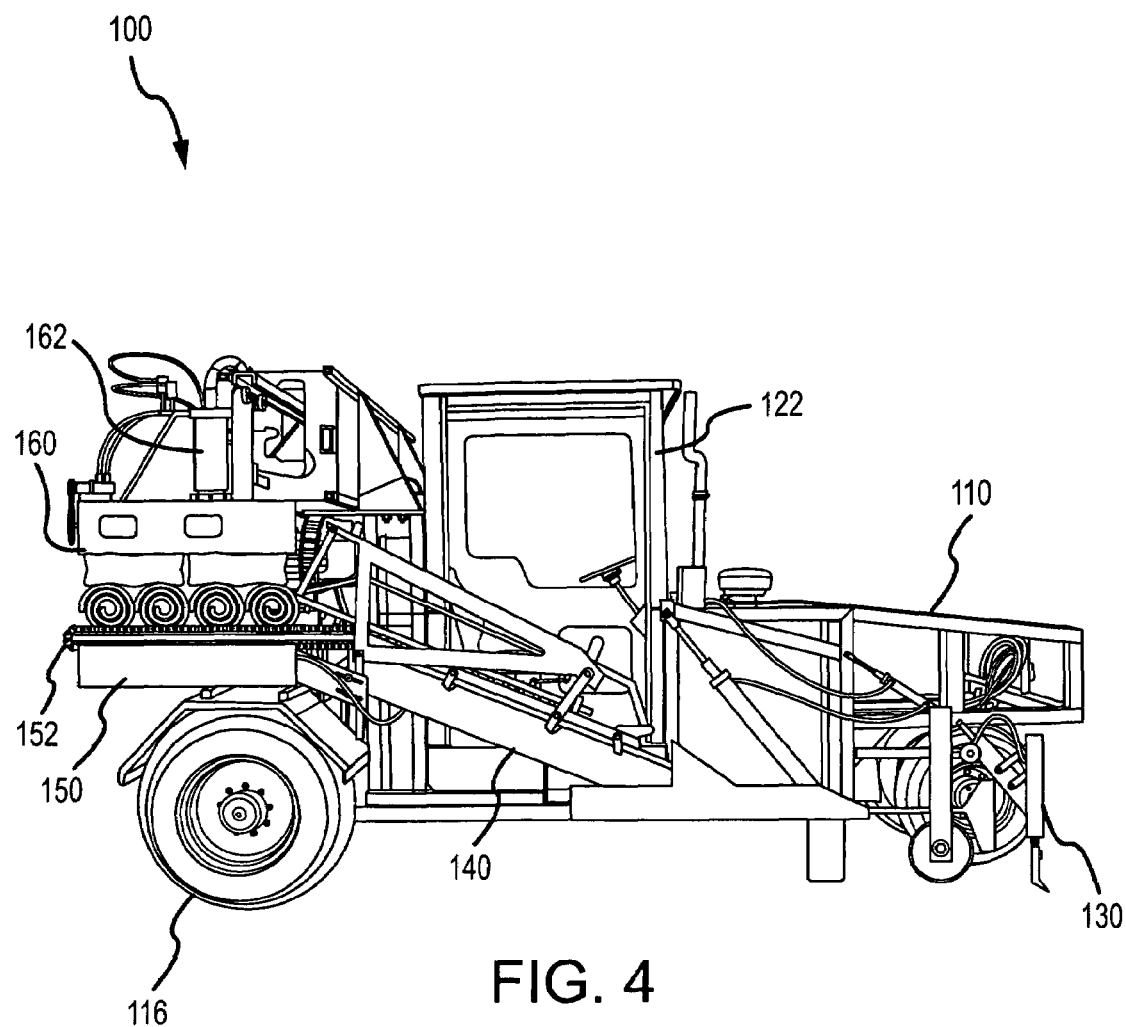
FIG. 4 shows a right side perspective view of a sod harvesting apparatus.
Figure 5:
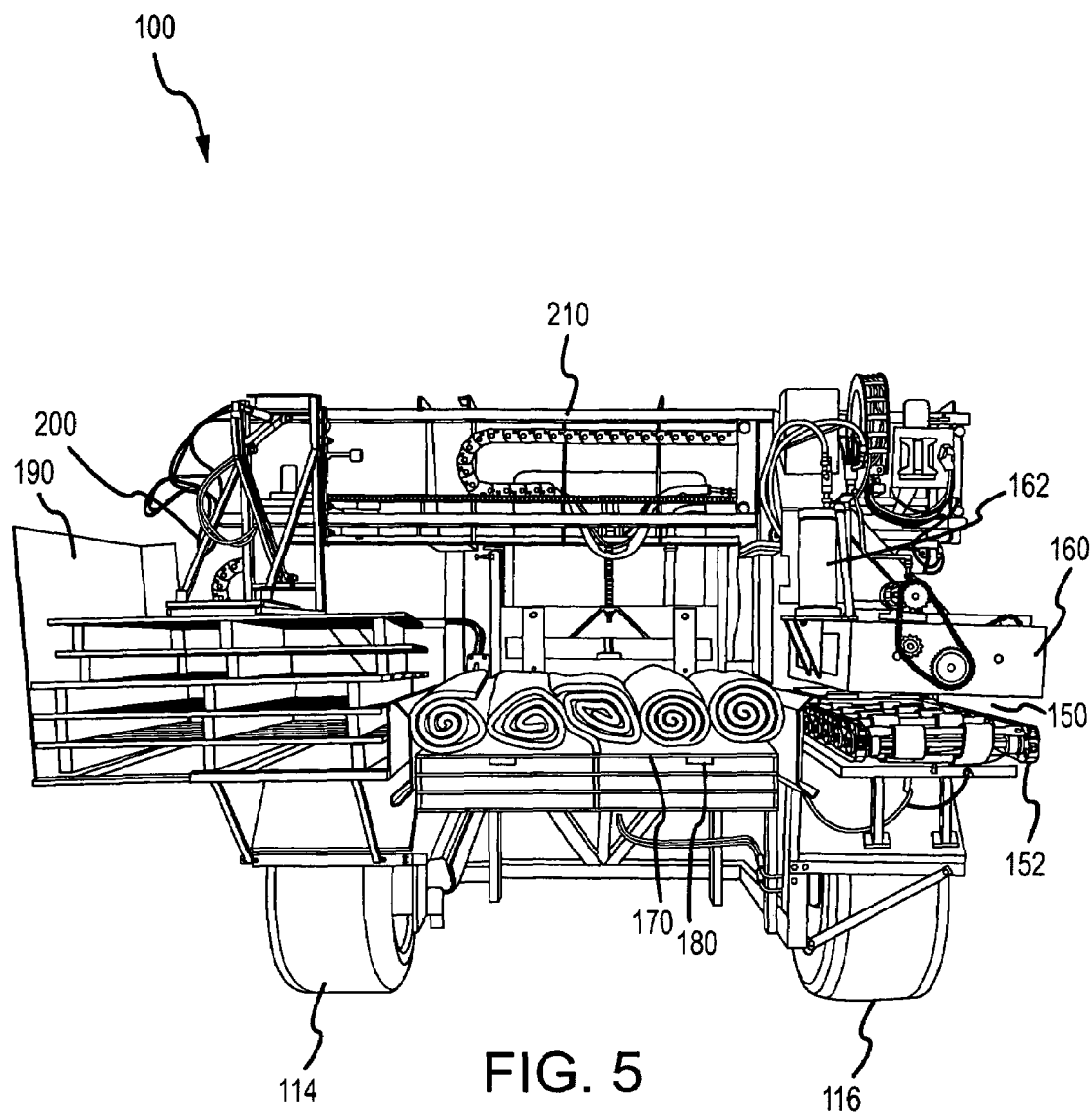
FIG. 5 shows a rear perspective view of a sod harvesting apparatus.
Figure 6:
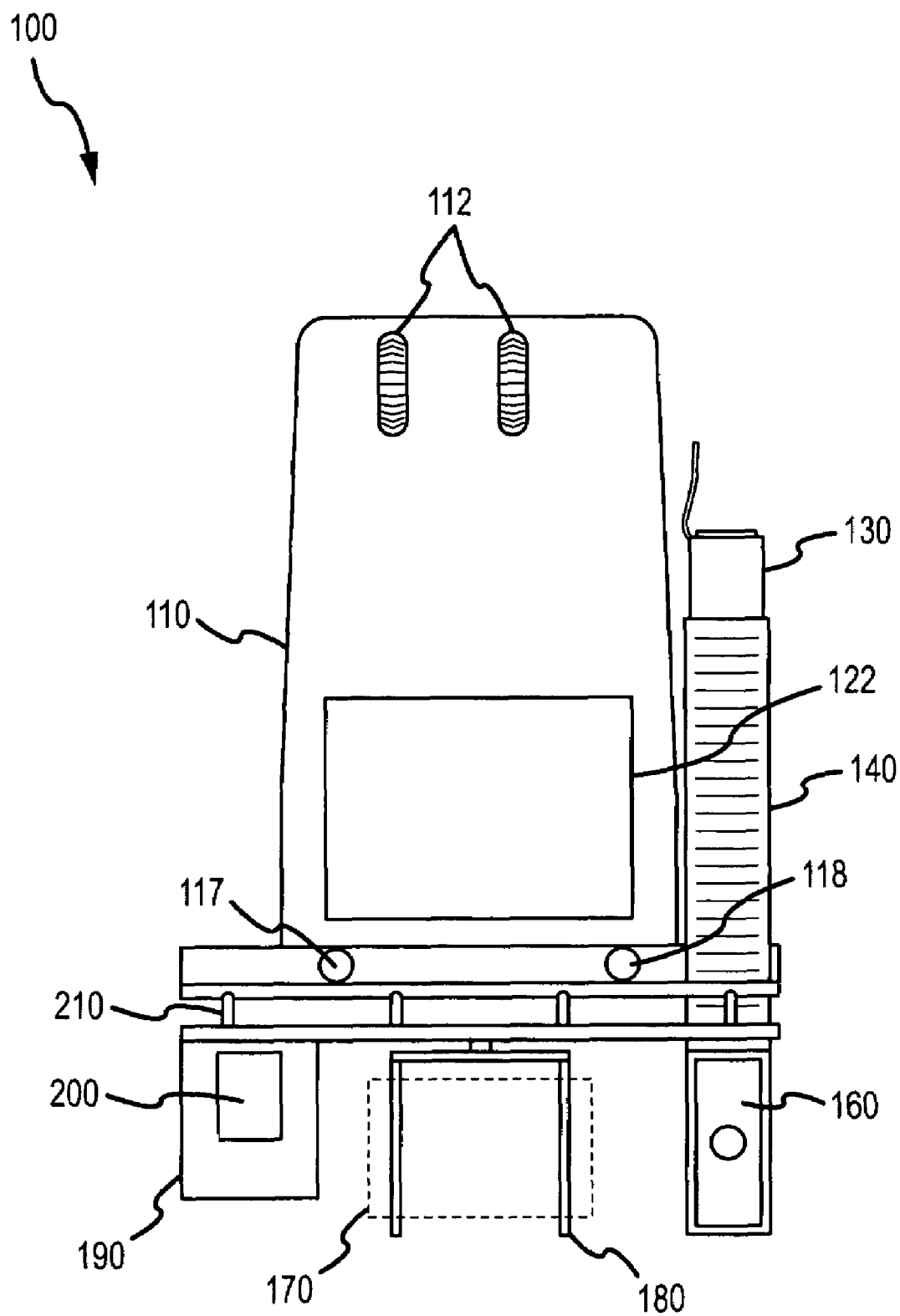
FIG. 6 shows a top view of a sod harvesting apparatus.

Referring now specifically to FIG. 3, transportation of the queue of sod rolls may be accomplished by use of a sod roll pickup mechanism 160. Sod roll pickup mechanism 160 may be any sod roll pickup mechanism known in the art, including, for example, the sod roll pickup mechanism disclosed in U.S. Pat. Nos. 6,681,864, 6,783,318, 6364,027 and 6,296,063 previously incorporated herein by reference. The number of sod rolls which may be engaged at one time by sod roll pickup mechanism 160 is not limited. Sod roll pickup mechanism 160 is capable of moving laterally between a position over sod roll queue 150 and a position over sod carrier 170 positioned on sod carrier support 180 (described in greater detail below) such that a queue of sod rolls may be transported between these two locations. Sod roll pickup mechanism 160 may also move vertically using, for example, a power cylinder 162, in order to engage sod rolls, lift them vertically before moving laterally and then lowering them vertically onto a sod carrier 170. Finally, sod roll pickup mechanism 160 may rotate in order to deposit sod rolls in one of at least two different orientations on sod carrier 170 (for example, perpendicular to the longitudinal axis of sod harvesting apparatus 100 and parallel to the longitudinal axis of sod harvesting apparatus 100). The manner in which sod roll pickup mechanism 160 engages and disengages a queue of sod rolls on empty sod carrier 170 is not limited.

Figure 7:
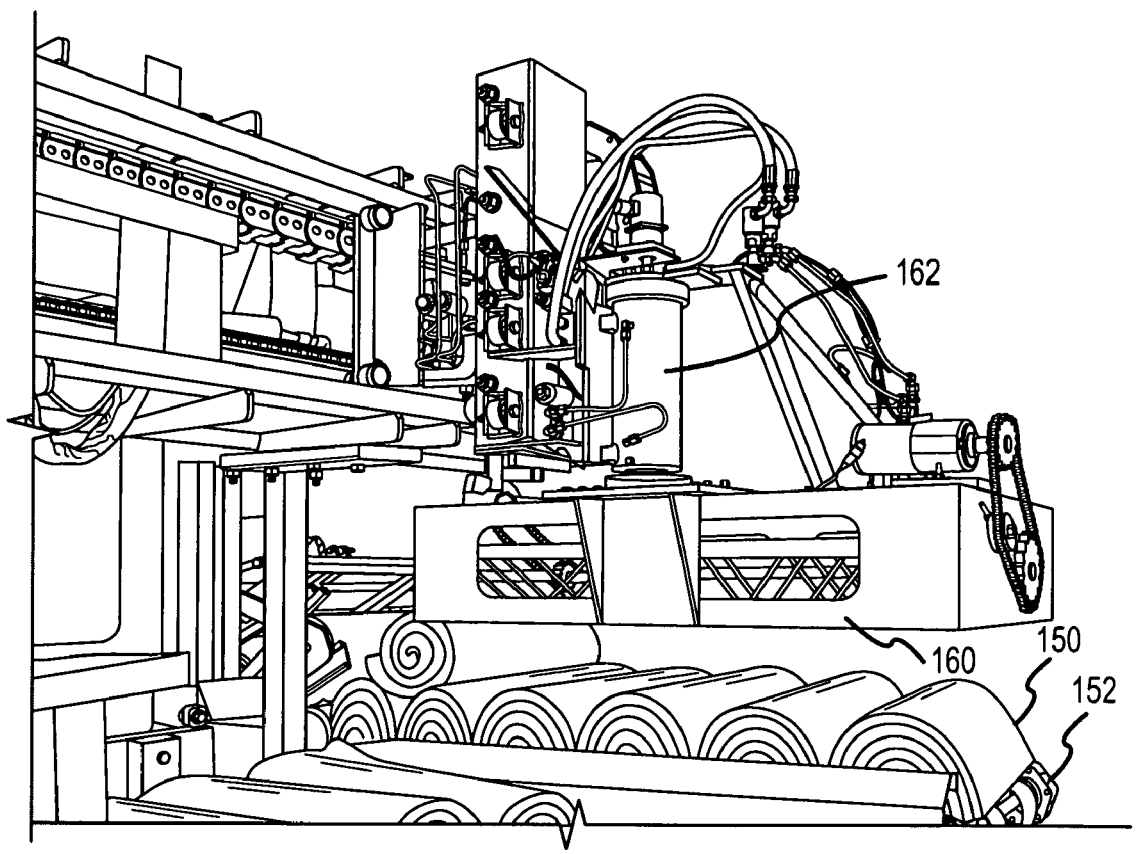
FIG. 7 shows a partial detail view of a sod pickup mechanism.
Figure 8:
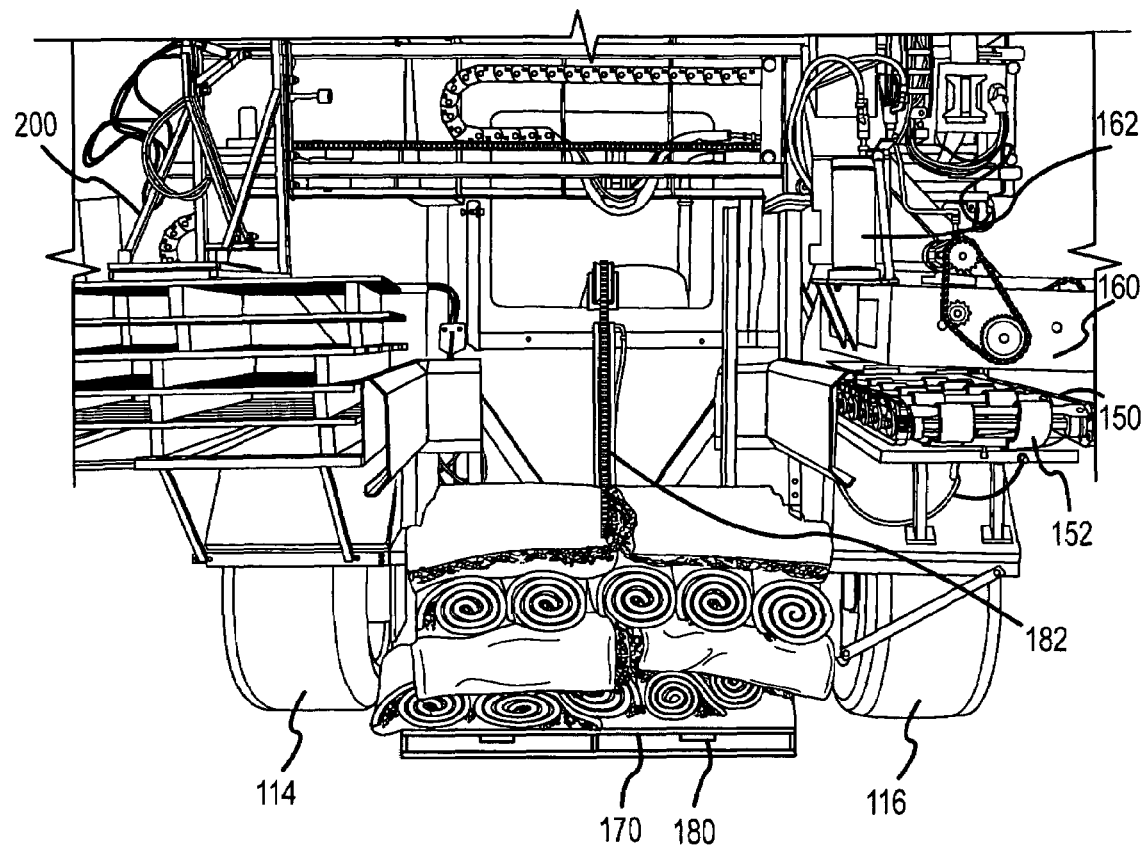
FIG. 8 shows a partial detail view of back of a sod harvesting apparatus with a pallet in a lowered position.

Referring now to FIGS. 7 and 8, sod roll queue 150 may be positioned to the side of sod harvesting apparatus 100 and the second end of sod roll queue 150 may terminate at the rear of sod harvesting apparatus 100. Also located at the rear of sod harvesting apparatus 100 and approximately centered along the rear of sod harvesting apparatus 100 may be a sod carrier 170. Sod carrier 170 may be where sod roll pickup mechanism 160 deposits a queue of sod rolls picked up from sod roll queue 150. Sod carrier 170 may be any suitable carrier, and in one aspect of the instant disclosure, sod carrier 170 is a pallet.

Sod carrier 170 may be positioned and supported at the center of the rear portion of sod harvesting apparatus 100 by a sod carrier support 180. Sod carrier support 180 may be any suitable support for sod carrier 170, and in one aspect of the instant disclosure, sod carrier support 180 is a fork that may engage gaps in a pallet. Sod carrier support 180 may include a mechanism for raising and lowering sod carrier 170 supported thereon, such that when sod rolls are being deposited on sod carrier 170, sod carrier support 180 is in a raised position and when sod carrier 170 is full, sod carrier support 180 is lowered to lower sod carrier 170 to the ground and deposit sod carrier 170 with sod rolls deposited thereon on the ground.

The manner in which sod rolls are deposited on sod carrier 170 is not limited. For example, sod rolls may be deposited on sod carrier 170 in a manner as described in any of U.S. Pat. Nos. 6,681,864, 6,783,318, 6,364,027 and 6,296,063. In one example, sod rolls are stacked on the sod carrier 170 by moving sod roll pickup mechanism 160 twice per row and by stacking adjacent rows transverse to each other.

As noted above, sod carrier 170 may be supported by sod carrier support 180, which may be lowered in order to deposit a full sod carrier 170 on the ground. Lowering and raising of sod carrier support 180 may be accomplished by, for example, a chain drive 182. During sod harvesting, sod carrier support 180 may be lowered upon depositing a complete layer of sod rolls on sod carrier 170 to permit sod roll pickup mechanism 160 to always deposit a set of sod rolls at substantially the same height.

When sod carrier 170 is deposited on the ground, sod carrier support 180 no longer supports a sod carrier 170. In order to load another sod carrier 170 on sod carrier support 180 and continue the sod harvesting process, sod harvesting apparatus 100 may also include a sod carrier holder 190 and a sod carrier transport mechanism 200. Sod carrier holder 190 may be positioned on the side of sod harvesting apparatus 100 opposite the side of sod harvesting apparatus 100 where cutter assembly 130 and conveyor assembly 140 are positioned and at the rear of sod harvesting apparatus 100. In other words, sod carrier 170 and sod carrier support 180 may be positioned between sod carrier holder 190 and sod roll queue 150 at the rear of sod harvesting apparatus 100.

Sod carrier holder 190 stores a plurality of sod carriers 170 not positioned on sod carrier support 180. The types and number of sod carriers 170 that sod carrier holder 190 may store is not limited. Sod carrier holder 190 may also store sod carriers 170 in any orientation, although a horizontal orientation is illustrated in the figures. Sod carrier holder 190 may be detachable from sod harvesting apparatus 100 or may be folded inwards towards sod harvesting apparatus 100 so as to make sod harvesting apparatus 100 more compact. The manner in which sod carrier holder 190 is detachable from sod harvesting apparatus 100 is not limited and may include, for example, screws or hooks. The manner in which sod carrier holder 190 may be folded inwards towards sod harvesting apparatus 100 is also not limited and may include, for example, hinges.

In order to move an empty sod carrier 170 from sod carrier holder 190 to sod carrier support 180, a sod carrier transport mechanism 200 engages an empty sod carrier 170 loaded in sod carrier holder 190 and transports it to sod carrier support 180. Sod carrier transport mechanism 200 may be capable of moving vertically to engage sod carriers 170 loaded in sod carrier holder 190 and deposit sod carrier 170 on sod carrier support 180. Sod carrier transport mechanism 200 may also be capable of moving laterally between a position over sod carrier holder 190 and sod carrier support 180 such that sod carriers 170 may be transported between these two locations. Sod carrier transport mechanism 200 may move between these two positions via a transport frame 210 described in greater detail below. Sod carrier transport mechanism 200 may include a pickup mechanism 202 for engaging sod carriers 170. The manner in which pickup mechanism 202 of sod carrier transport mechanism 200 engages an empty sod carrier 170 loaded in sod carrier holder 190 and disengages an empty sod carrier 170 on sod carrier support 180 is not limited.

Figure 9:
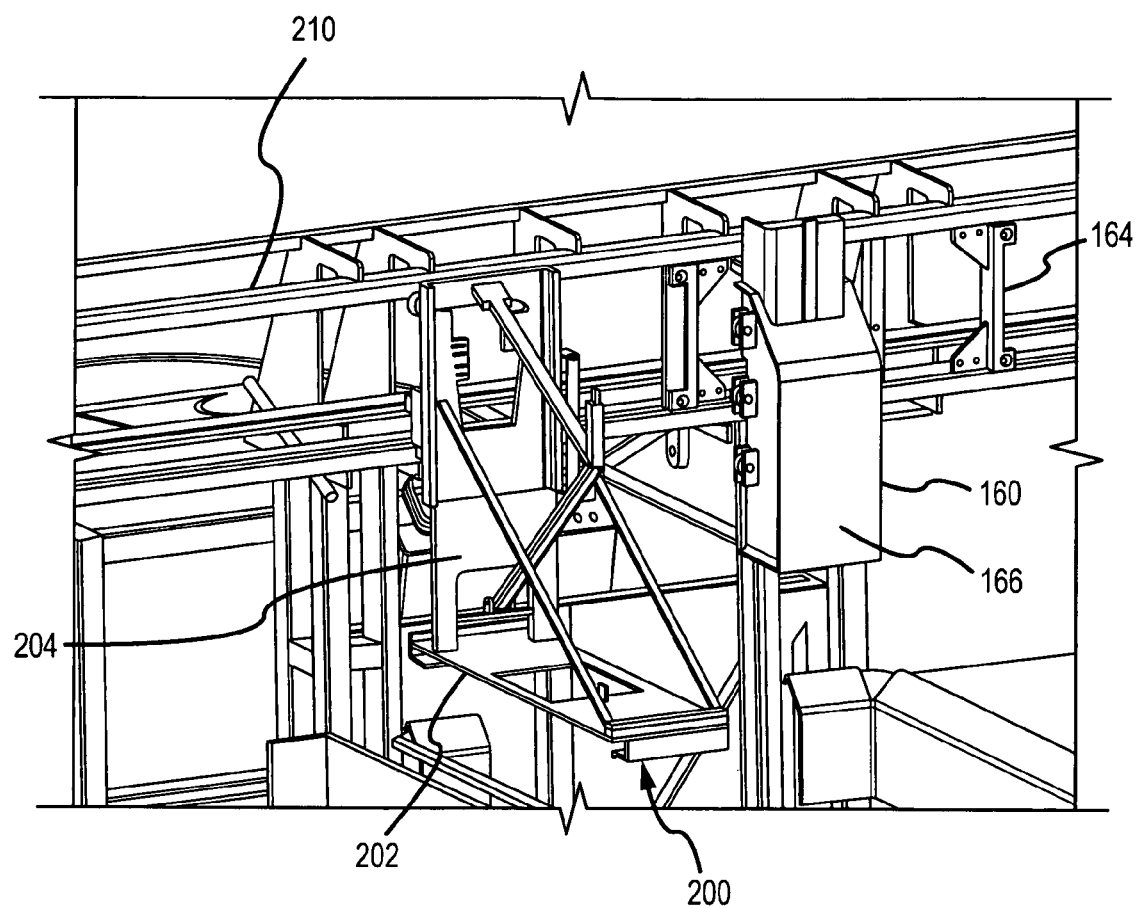
FIG. 9 shows a partial detail view of a pallet carrier and a sod roll carrier.
Figure 10:
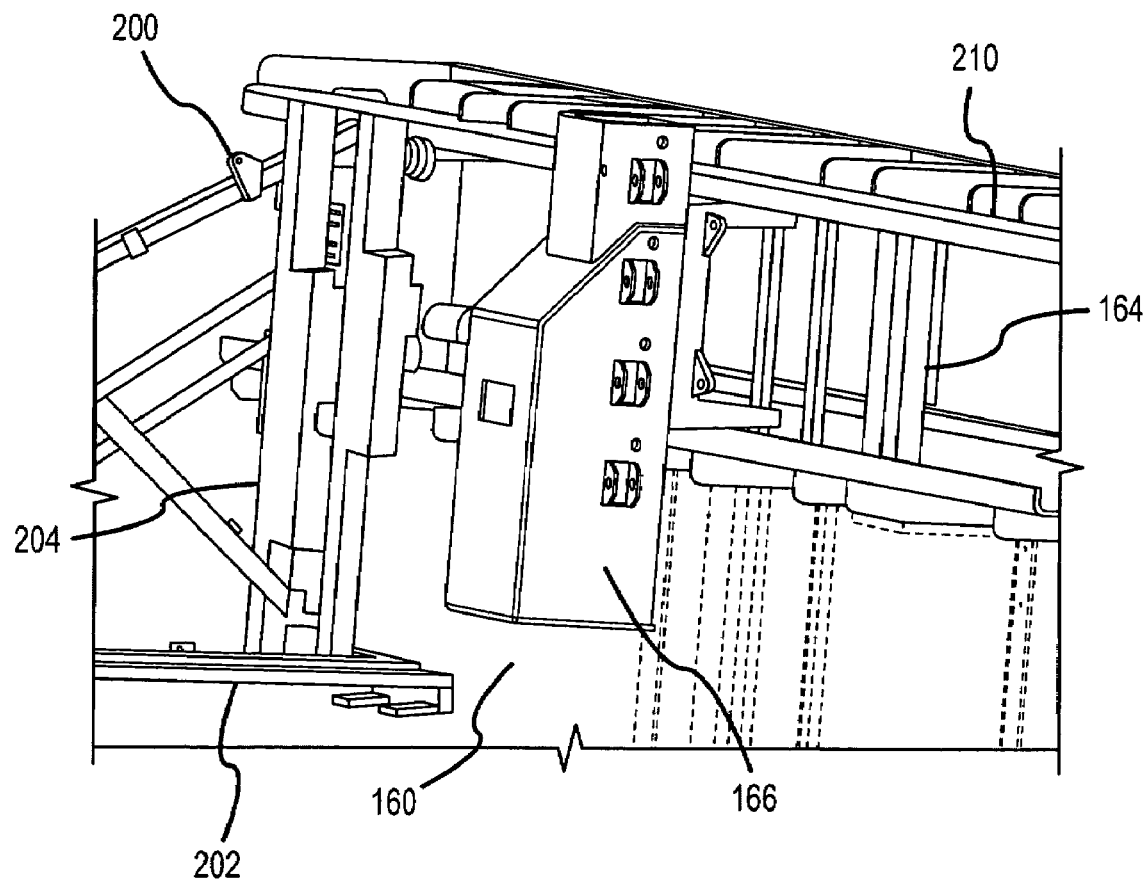
FIG. 10 shows another partial detail view of a pallet carrier and a sod roll carrier.
Figure 11:
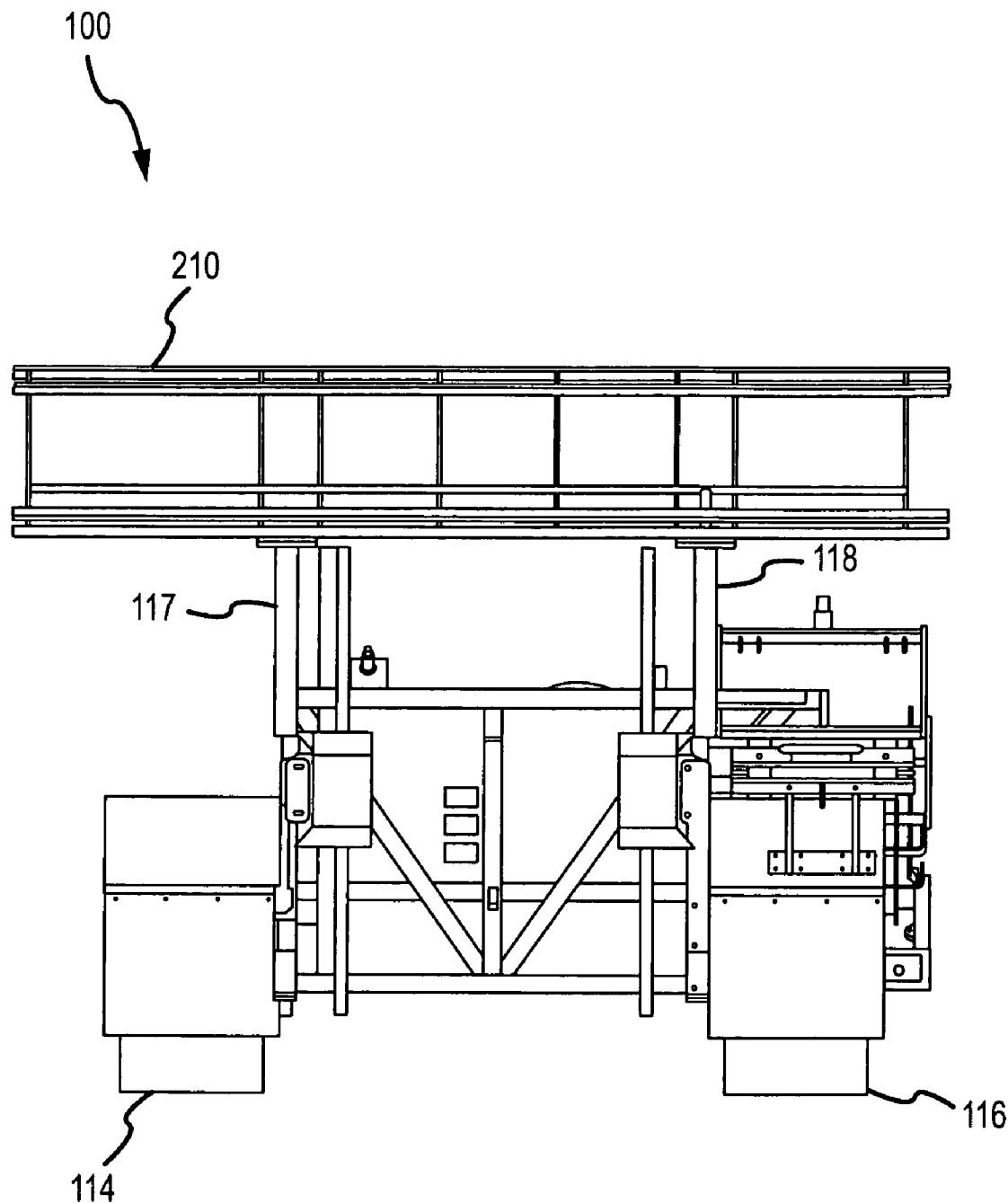
FIG. 11 shows a rear view of a sod harvesting apparatus in a first configuration.
Figure 12:
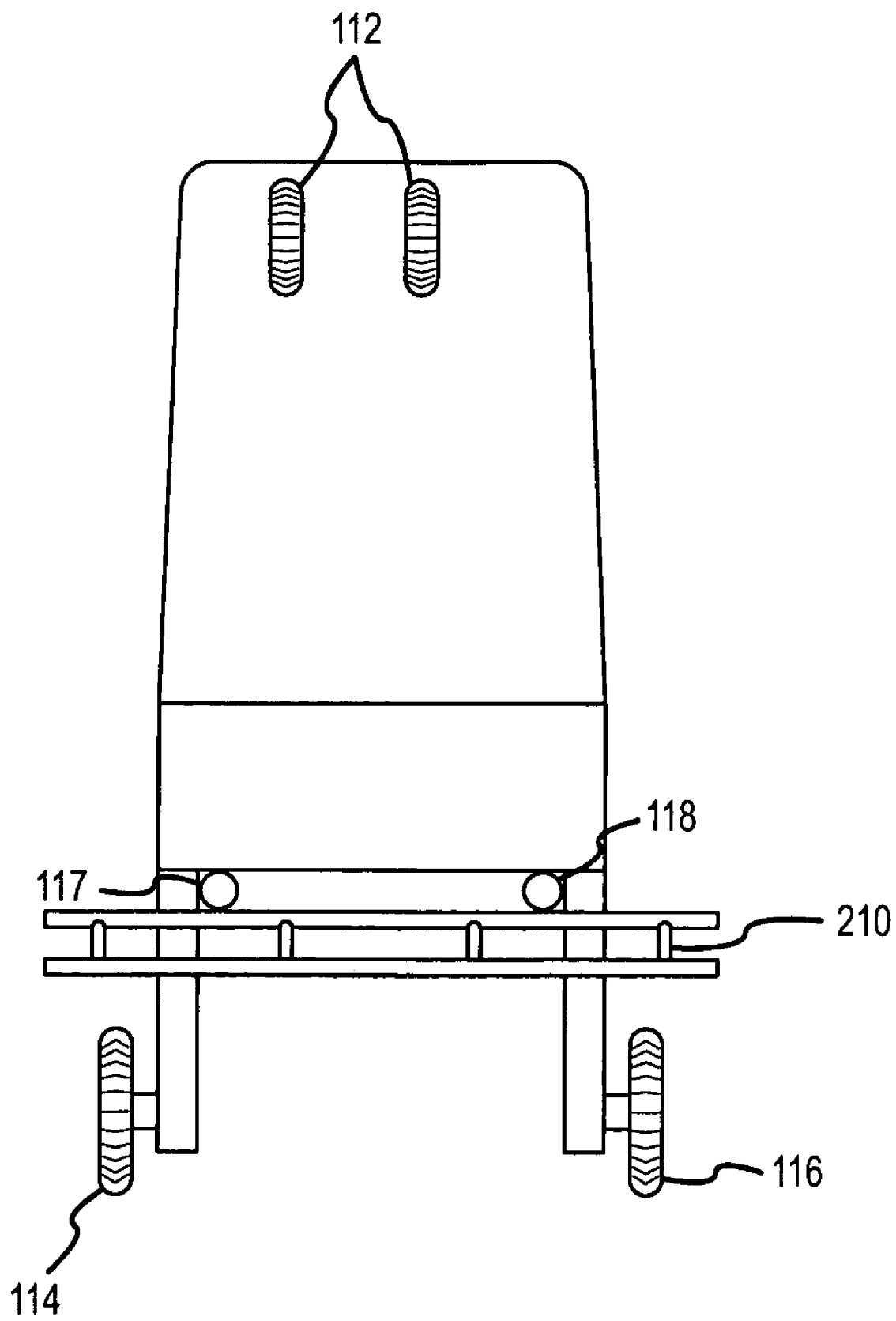
FIG. 12 shows a top view of a sod harvesting apparatus in a first configuration.

Sod harvesting apparatus 100 may also include a transport frame 210. As shown in FIGS. 9 and 10, sod carrier transport mechanism 200 and sod roll pickup mechanism 160 may be attached to transport frame 210. In order to illustrate the connection of sod carrier transport mechanism 200 and sod roll pickup mechanism 160 to transport frame 210, only portions of sod carrier transport mechanism 200 and sod roll pickup mechanism 160 are shown in FIGS. 9 and 10. Transport frame 210 may include support rails 212, 214. Sod carrier transport mechanism 200 may include pickup mechanism 202 and support carriage 204 that connects to first and second rails 212, 214 of transport frame 210. Sod roll pickup mechanism 160 may include carriage support assembly 164 that attaches to the first and second rails 212, 214 of transport frame 210. A support 166 connects to carriage support assembly 164 and to power cylinder 162 of sod roll pickup mechanism 160.

Turning back to FIG. 6, transport frame 210 may be located at the rear of sod harvesting apparatus 100 and oriented perpendicular to the longitudinal axis of sod harvesting apparatus 100. Transport frame 210 may extend the width of sod harvesting apparatus 100 and may extend over sod carrier holder 190 and sod roll queue 150 such that sod carrier transport mechanism 200 may be positioned over sod carrier holder 190 and sod roll pickup mechanism 200 may be positioned over sod roll queue 150. Sod roll pickup mechanism 160 and sod carrier transport mechanism 200 may move laterally along transport frame 210. In such a manner, sod carrier transport mechanism 200 may move between sod carrier holder 190 and sod carrier support 180, and sod roll pickup mechanism 160 may move between sod roll queue 150 and sod carrier support 180 as described above.

Transport frame 210 may be aligned horizontally and may be held in position by a plurality of vertically aligned poles extending from frame 110 of sod harvesting apparatus 100. As shown in the FIG. 6, two vertically aligned poles 117, 118 support transport frame 210. Transport frame 210 may be detachably coupled to a first pole 117 and rotatingly coupled to a second pole 118 such that when transport frame 210 is detached from first pole 117, transport frame 210 may pivot about second pole 118. The detachable connection between first pole 117 and transport frame 210 may be any suitable detachable connection. The rotating connection between second pole 118 and transport frame 210 may be any suitable rotating connection.

As noted previously, sod harvesting apparatus may include a first rear wheel 114 and a second rear wheel 116 located at the rear of sod harvesting apparatus 100. First rear wheel 114 may be generally located under sod carrier holder 190 and second rear wheel 116 may be generally located under sod roll queue 150. First rear wheel 114 and second rear wheel 116 may be located outside of frame 110. First rear wheel 114 and second rear wheel 116 may driven by, for example, an engine, such that sod harvesting apparatus 100 is self-propelled.

Figure 13:
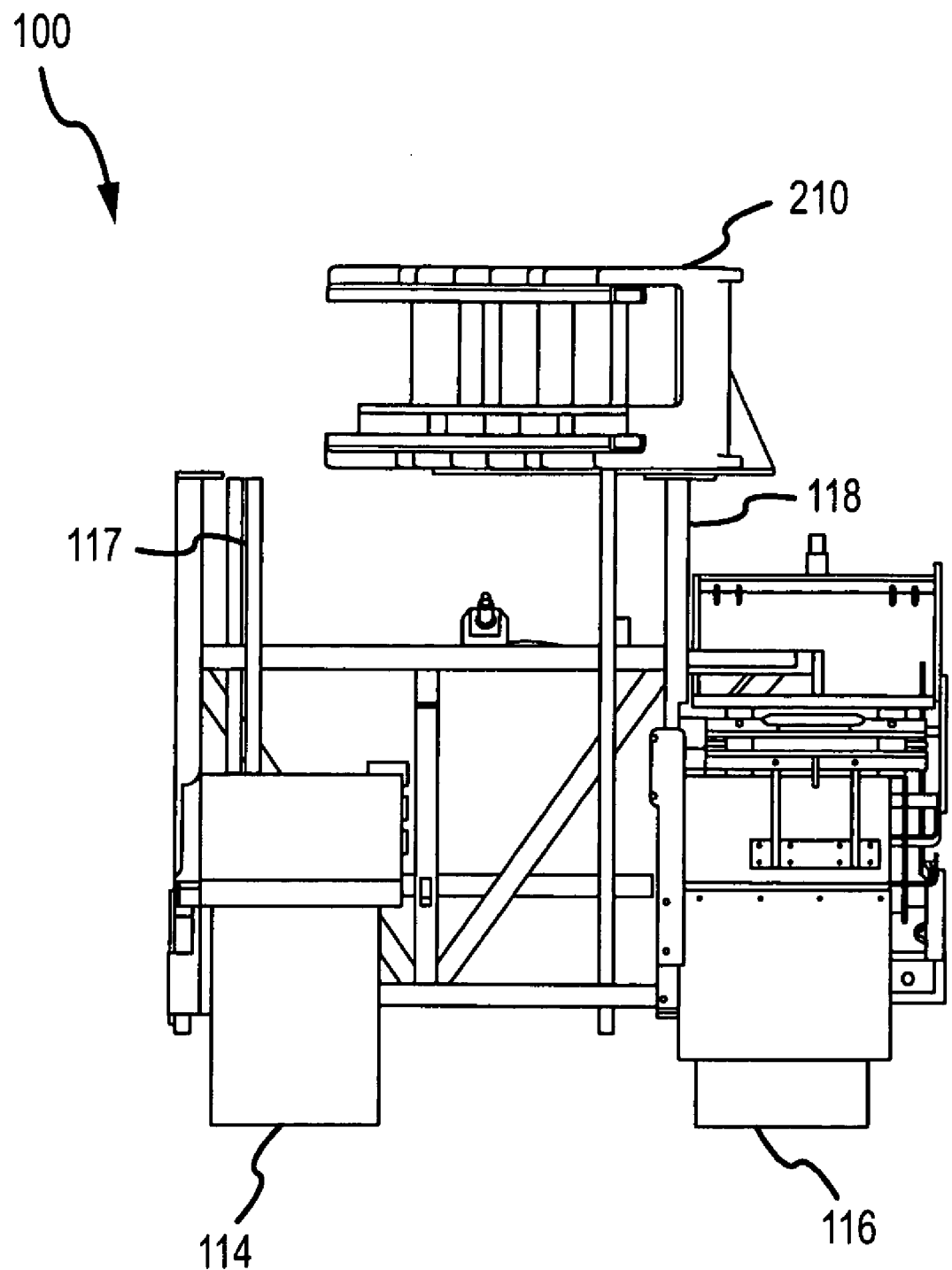
FIG. 13 shows rear view of a sod harvesting apparatus in a second configuration.
Figure 14:
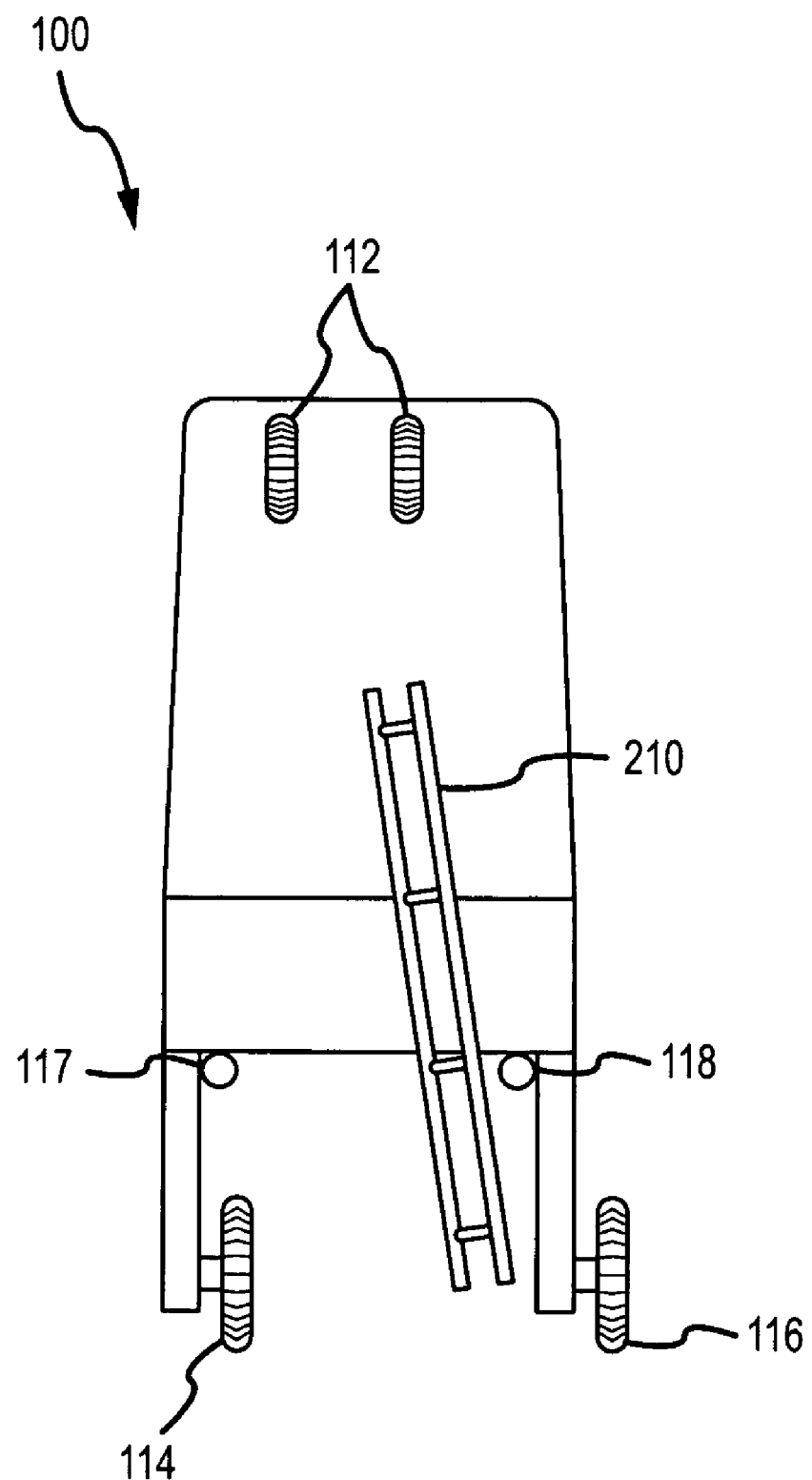
FIG. 14 shows a top view of a sod harvesting apparatus in a second configuration.

Turning now to FIGS. 11-14, sod harvesting apparatus 100 may include a first configuration (FIGS. 11 and 12) and a second configuration (FIGS. 13 and 14). The first configuration may be the configuration used when sod harvesting apparatus 100 is being used in the field to harvest sod rolls. The second configuration may be used when the size of sod harvesting apparatus 100 needs to be reduced, for example, when transporting or shipping sod harvesting apparatus 100, when placing sod harvesting apparatus 100 in a container, or when storing sod harvesting apparatus 100.

The majority of the components of sod harvesting apparatus 100 may remain in the same position and location between first and second configurations. The components which may change position between first and second configurations include transport frame 210 and first rear wheel 114.

In the first configuration, first rear wheel 114 is located outside of frame 110 and transport frame 210 is aligned perpendicular to the longitudinal axis of sod harvesting apparatus 100. In this first configuration, sod harvesting apparatus 100 is set up for use in the field and harvesting of sod. Transport frame 210 is aligned such that sod roll pickup mechanism 160 and sod carrier transport mechanism 200 attached thereto may move laterally on transport frame 210 and transport sod carriers 170 located on one side of sod harvesting apparatus 100 and sod rolls located on the opposite side of sod harvesting apparatus 100 towards the central rear portion of sod harvesting apparatus 100 where sod rolls are collected on sod carrier 170 resting on sod carrier support 180. Furthermore, first rear wheel 114 is located outside of frame 110 in the first configuration, which provides better balance and stability to sod harvesting apparatus 100 moving through a field and collecting sod rolls.

In the second configuration, first rear wheel 114 is located inside of frame 110 and transport frame 210 is aligned generally parallel to the longitudinal axis of sod harvesting apparatus 100. The inside of frame 110 is generally defined by the frame 110 and includes any area inside of frame 110. In the second configuration, sod harvesting apparatus 100 is set up for transportation, shipping, storage and the like. For example, by moving sod harvesting apparatus 100 to the second configuration and reducing the overall size of sod harvesting apparatus 100, sod harvesting apparatus 100 may fit inside of a shipping container used to ship large equipment.

Figure 15:
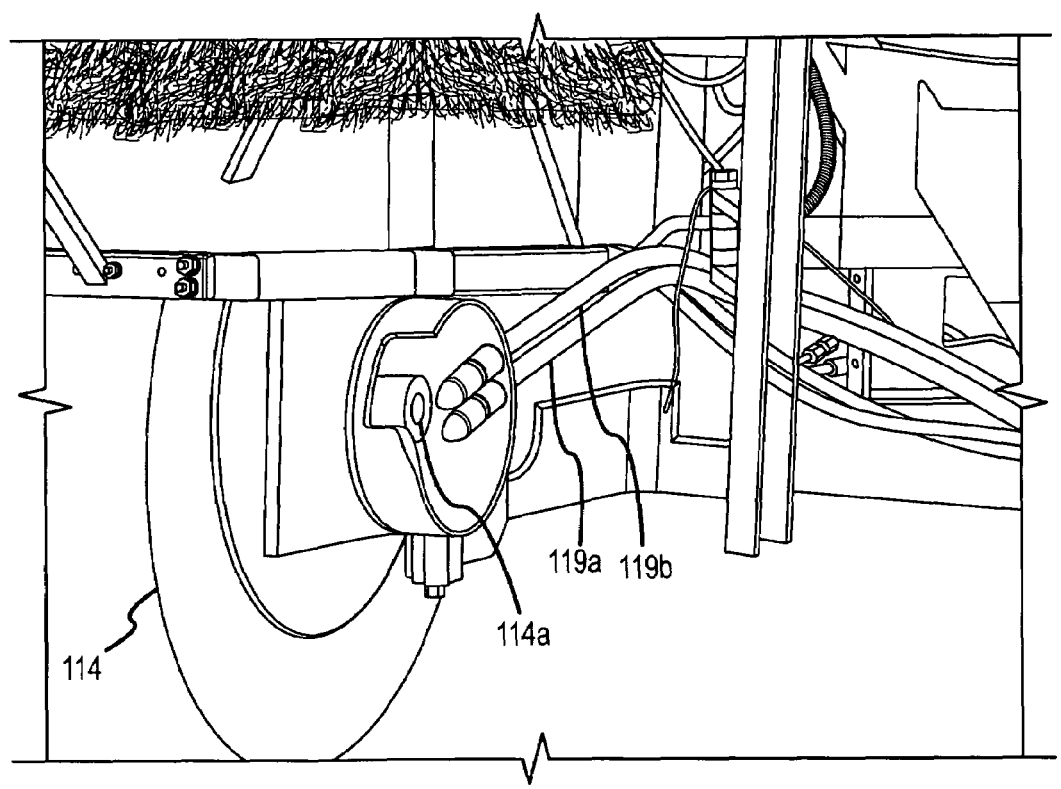
FIG. 15 shows a detail view of a rear wheel connection in a first configuration.

In order to move between first configuration and second configuration, first rear wheel 114 may attach to frame 110 in two or more different positions. In the first position, corresponding to the first configuration, first rear wheel 114 is positioned generally outside of frame 110. In the second position, corresponding to the second configuration, first rear wheel 114 may be pivoted, removed and reattached, or otherwise positioned on the inside of frame 110. For example, as shown in FIG. 15, bolts 114a are used to attach first rear wheel 114 to the inside of frame 110. Bolts 114a may be removed such that first rear wheel 114 may be removed from its position on the inside of frame 110 and positioned on the outside of frame 110. Bolts 114a used to secure first rear wheel 114 to the inside of frame 110 may also be used to secure first rear wheel 114 to the outside of frame 110. First rear wheel 114 may be attached at opposite sides of the same location of frame 110 or at different locations on either side of frame 110.

In this second configuration, the controls to first rear wheel 114 may be changed to allow sod harvesting apparatus 100 to be driven in the new wheel position. For example, first rear wheel 114 may be controlled hydraulically and the hydraulic connections at first rear wheel 114 may be reversed to drive first rear wheel 114 in the second configuration (e.g., to drive sod harvesting apparatus 100 into a container). When first rear wheel 114 is powered hydraulically as discussed above, first and second hydraulic hoses 119a, 119b may be connected to first rear wheel 114. When switching first rear wheel 114 from a first configuration to a second configuration, hydraulic hoses 119a, 119b may be reversed to permit sod harvesting apparatus 100 to power first rear wheel 114. For example, switching hydraulic hoses 119a, 119b to power first rear wheel 114 in the second configuration will allow sod harvesting apparatus 100 to be driven into a container or other confined area. While hydraulic power is discussed above, any power supply to first rear wheel 114 may be used so long as the actuator to first rear wheel 114 may be adjusted to permit actuated movement of first rear wheel 114 in the second configuration.

In order to move between first configuration and second configuration, transport frame 210 may be detachably coupled to first pole 117 and rotatingly coupled to second pole 118 such that transport frame 210 may pivot about second pole 118. The range of rotation of transport frame 210 about second pole 118 is not limited. In one example, transport frame 210 is pivoted approximately 70 degrees between its first position, corresponding to a first configuration, and its second position, corresponding to a second configuration. Accordingly, transport frame 210 is not exactly parallel with the longitudinal axis of sod harvesting apparatus 110 in the second configuration, but is generally parallel with such axis. To further allow for rotation of transport frame 210, a top 122 of cab 120 may be removed. Removing top 122 of cab 120 may allow for easier rotation of transport frame 210 between the first configuration and the second configuration and further compacts the size of sod harvesting apparatus 100 to make sod harvesting apparatus 100 more suited for transportation.

Although the present invention has been described with respect to particular embodiments thereof, variations are possible. The present invention may be embodied in specific forms without departing from the essential spirit or attributes thereof. It is desired that the embodiments described herein be considered in all respects illustrative and not restrictive and that reference be made to the appended claims and their equivalents for determining the scope of the invention.

What is claimed is:

1. A sod harvesting apparatus having a first configuration and a second configuration, the sod harvesting apparatus comprising:
    a frame defining an inner sod harvesting apparatus area;
    a first rear wheel and a second rear wheel coupled to the frame, wherein in the first configuration the first rear wheel is located outside the inner sod harvesting apparatus area, wherein in the second configuration the first rear wheel is located inside the inner sod harvesting apparatus area, and wherein the first rear wheel is operational in either the first configuration or the second configuration; and
    a transport frame, wherein in the first configuration the transport frame is oriented generally perpendicular to a longitudinal axis of the sod harvesting apparatus, wherein in the second configuration the transport frame is oriented generally parallel to the longitudinal axis of the sod harvesting apparatus, and wherein the transport frame is coupled to the frame of the sod harvesting apparatus via a first support and a second support and the transport frame is detachably coupled to the first support and pivotably attached to the second support to allow the transport frame to move between the first configuration and the second configuration.

2. The sod harvesting apparatus of claim 1, wherein the first rear wheel pivots between the first configuration and the second configuration.

3. The sod harvesting apparatus of claim 1, wherein the frame comprises a first rear wheel first connection area located outside the inner sod harvesting apparatus area and a first rear wheel second connection area located inside the inner sod harvesting apparatus area, wherein in the first configuration the first rear wheel is coupled to the frame at the first rear wheel first connection area, and wherein in the second configuration the first rear wheel is coupled to the frame at the first rear wheel second connection area.

4. The sod harvesting apparatus of claim 3, wherein the first rear wheel first connection area and the first rear wheel second connection area are located on opposite sides of a same portion of the frame.

5. The sod harvesting apparatus of claim 3, further comprising a power source for actuating the first rear wheel, wherein the power source is capable of actuating the first rear wheel in either the first configuration or the second configuration.

6. The sod harvesting apparatus of claim 2, further comprising a power source for actuating the first rear wheel, wherein the power source is capable of actuating the first rear wheel in either the first configuration or the second configuration.

7. The sod harvesting apparatus of claim 1, wherein the transport frame is 10 to 30 degrees off of the longitudinal axis of the apparatus when the sod harvesting apparatus is in the second configuration.

8. The sod harvesting apparatus of claim 1, wherein the position of the transport frame in the first configuration is separated by 70 degrees from the position of the transport frame in the second configuration.

9. The sod harvesting apparatus of claim 1, further comprising:
   a pallet carrier for storing a plurality of empty pallets.

10. The sod harvesting apparatus of claim 9, wherein the pallet carrier is detachably coupled to the frame.

11. The sod harvesting apparatus of claim 1, further comprising:
   a pallet carrier for storing a plurality of empty pallets, wherein in the first configuration the pallet carrier is oriented generally horizontally, wherein in the second configuration the pallet carrier is oriented generally vertically, and wherein the pallet carrier pivots between the horizontal orientation and the vertical orientation.

12. The sod harvesting apparatus of claim 1, further comprising:
   a cab, the cab comprising a top and being located centrally on the frame.

13. The sod harvesting apparatus of claim 12, wherein the top of the cab is removable.

14. The sod harvesting apparatus of claim 13, wherein in the second configuration, the top of the cab is removed.

15. A sod harvesting apparatus having a first configuration and a second configuration, the sod harvesting apparatus comprising:
   a frame defining an inner sod harvesting apparatus area; and
   a transport frame, wherein in the first configuration the transport frame is oriented generally perpendicular to a longitudinal axis of the sod harvesting apparatus, wherein in the second configuration the transport frame is oriented generally parallel to the longitudinal axis of the sod harvesting apparatus, and wherein the transport frame is coupled to the frame of the sod harvesting apparatus via a first support and a second support and the transport frame is detachably coupled to the first support and pivotably attached to the second support to allow the transport frame to move between the first configuration and the second configuration.

16. The sod harvesting apparatus of claim 15, further comprising:
   a cab, the cab comprising a top and being located centrally on the frame;
   wherein the top of the cab is removable and wherein in the second configuration, the top of the cab is removed.

17. A sod harvesting apparatus having a first configuration and a second configuration, the sod harvesting apparatus comprising:
   a frame defining an inner sod harvesting apparatus area;
   a first rear wheel and a second rear wheel coupled to the frame, wherein in the first configuration the first rear wheel is located outside the inner sod harvesting apparatus area, wherein in the second configuration the first rear wheel is located inside the inner sod harvesting apparatus area, and wherein the first rear wheel is operational in either the first configuration or the second configuration; and
   a transport frame, wherein in the first configuration the longitudinal axis of the transport frame is oriented generally perpendicular to a longitudinal axis of the sod harvesting apparatus, and wherein in the second configuration the longitudinal axis of the transport frame is oriented generally parallel to the longitudinal axis of the sod harvesting apparatus.

* * * * *